(12) United States Patent
Chen et al.

(10) Patent No.: US 10,476,376 B1
(45) Date of Patent: Nov. 12, 2019

(54) HIGH POWER FACTOR CONVERTER

(71) Applicant: National Chung-Shan Institute of Science and Technology, Taoyuan (TW)

(72) Inventors: Kun-Feng Chen, Taoyuan (TW); Jung-Yang Wang, Kinmen County (TW); Chin-Yu Ho, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/223,062

(22) Filed: Dec. 17, 2018

(51) Int. Cl.
*H02M 1/42* (2007.01)
*H02M 1/14* (2006.01)
*H02M 1/44* (2007.01)
*H02M 3/335* (2006.01)

(52) U.S. Cl.
CPC .......... *H02M 1/4208* (2013.01); *H02M 1/14* (2013.01); *H02M 1/44* (2013.01); *H02M 3/33507* (2013.01)

(58) Field of Classification Search
CPC ........ H02M 1/4208; H02M 1/14; H02M 1/44; H02M 3/33507; H02M 1/4258; H02M 1/266
See application file for complete search history.

(56) References Cited

U.S. PATENT DOCUMENTS

| | | | | |
|---|---|---|---|---|
| 5,982,638 A | * | 11/1999 | Tang | H02M 1/4258 363/16 |
| 6,108,222 A | * | 8/2000 | Liang | H02M 1/4258 363/126 |
| 6,115,271 A | * | 9/2000 | Mo | H02M 1/34 363/21.12 |
| 7,149,097 B1 | * | 12/2006 | Shteynberg | H02M 1/4258 363/16 |
| 9,445,468 B1 | * | 9/2016 | Cheng | H02M 1/4258 |
| 2014/0192562 A1 | * | 7/2014 | Cho | H02M 1/4258 363/21.12 |

* cited by examiner

*Primary Examiner* — Adolf D Berhane
*Assistant Examiner* — Sisay G Tiku
(74) *Attorney, Agent, or Firm* — Winston Hsu (57) ABSTRACT

A high power factor converter is provided. The high power factor converter includes a rectifier, a reactive power control circuit and a converter circuit. The rectifier is utilized for receiving and converting an input AC voltage in to an input DC voltage. The reactive power control circuit is coupled to the rectifier for performing a reactive power control operation based on the input DC voltage. The converter circuit is coupled to the reactive power control circuit for converting the input DC voltage into an output voltage.

10 Claims, 12 Drawing Sheets

HIGH POWER FACTOR CONVERTER

BACKGROUND OF THE INVENTION

1. Field of the Invention

The present invention relates to a converter, and more particularly, to a converter capable of providing high power factor and low output voltage ripple.

2. Description of the Prior Art

With advanced development in technology, various electronic products, such as a notebook, a mobile phone, a personal digital assistant, a multimedia player, etc., have been presented and are utilized widely in daily life. In general, a power converter is required for providing operating power for the electronic products. Furthermore, the power converter is capable of converting an alternating current (AC) power to a direct current (DC) power for operation of the electronic products.

Figure 1:
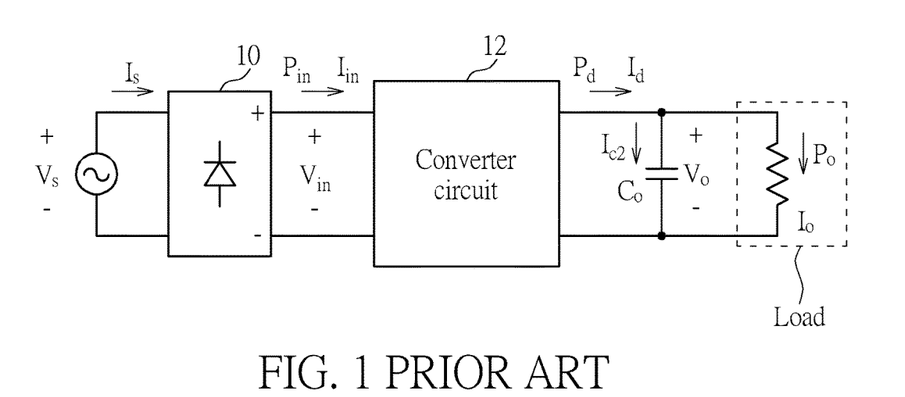
FIG. 1 is a schematic diagram of a conventional flyback converter according to the prior art.
Figure 2:
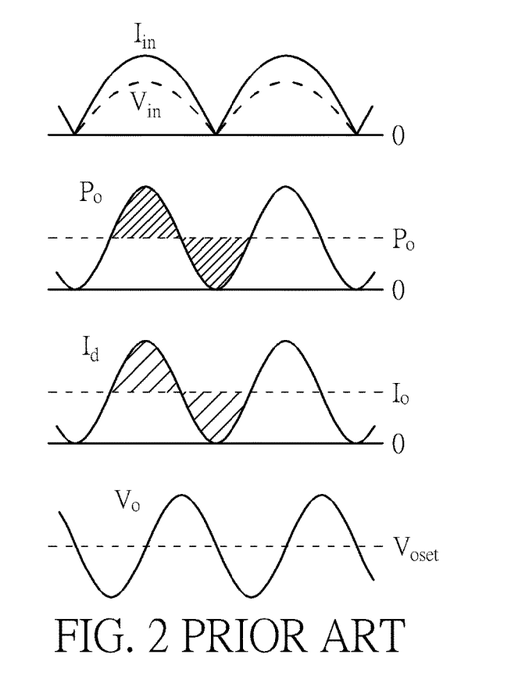
FIG. 2 is a waveform diagram illustrating waveform of the conventional flyback converter shown in FIG. 1 operating at unity power factor according to the prior art.

Please refer to FIG. 1 and FIG. 2. FIG. 1 is a schematic diagram of a conventional flyback converter 1 according to the prior art. FIG. 2 is a waveform diagram illustrating waveform of the conventional flyback converter 1 shown in FIG. 1 operating at unity power factor according to the prior art. The flyback converter 1 converts an input AC voltage Vs into an output DC voltage $V_o$ for a load. The flyback converter 1 includes a rectifier 10, a converter circuit 12 with high power factor scheme and an output capacitor $C_o$. The interconnections of the units of the conventional flyback converter 1 are as shown in FIG. 1. As shown in FIG. 1, an output power of the conventional converter 1 can be described as the following equation:

$$P_{in} = 2V_{in}I_{in}\sin^2\omega x = V_{in}I_{in}(1-\cos 2\omega t) \quad (1)$$

Where $V_{in}$ represents the root mean square value of the input voltage. $I_{in}$ represents the root mean square value of the input current. Suppose the output voltage is adjusted to a constant value $V_d$. Consider the power balance in the conventional converter 1, the output power $P_d$ is equal to the input power $P_{in}$. The output current $i_d$ can be expressed as follows:

$$i_d = P_d/V_o = \frac{V_{in}I_{in}}{V_o}(1-\cos 2\omega t) = I_o(1-\cos 2\omega t) = I_o + I_{c2} \quad (2)$$

Where $I_o$ represents a load current, the load current $I_o$ is the direct current component of the output current $i_d$, $I_{c2}$ represents a secondary current of the output current $i_d$, the secondary current $I_{c2}$ charges the output capacitor $C_o$ to consume secondary reactive power, such that the secondary ripple exists in the output voltage. The amount of the secondary ripple can be expressed as follows:

$$V_{o2} = I_{c2}X_{c2} = \frac{I_o}{2\omega C_o} \quad (3)$$

Where $\omega$ represents the mains frequency, the mains frequency $\omega$ is usually quite low. According to equation (3), if a lower secondary ripple of the output voltage is required and the mains frequency $\omega$ is usually quite low, a large output capacitor is needed, resulting in practically difficult in practical applications. Thus, there is a need for improvement of the prior art.

SUMMARY OF THE INVENTION

Based on the aforementioned disadvantages of the prior art, it is therefore a primary objective of the present invention to provide a converter capable of providing high power factor and low output voltage ripple, so as to solve the above mentioned problems.

In order to achieve the aforementioned objective, the present invention provides a high power factor converter, comprising: a rectifier for receiving and converting an input alternating current (AC) voltage in to an input direct current (DC) voltage; a reactive power control circuit coupled to the rectifier for performing a reactive power control operation based on the input DC voltage; and a converter circuit coupled to the reactive power control circuit for converting the input DC voltage into an output voltage.

According to one embodiment of the present invention, the high power factor converter comprises an electromagnetic interference (EMI) filter for filtering and suppressing EMI noise for the input AC voltage, comprising: a first inductor, wherein a first terminal of the first inductor is coupled to a AC power source for receiving the input AC voltage and a second terminal of the first inductor is coupled to the rectifier; a first capacitor, wherein a first terminal of the first capacitor is coupled to the first terminal of the first inductor and a second terminal of the first capacitor is coupled to a first ground; and a second capacitor, wherein a first terminal of the second capacitor is coupled to the second terminal of the first inductor and a second terminal of the second capacitor is coupled to the first ground.

According to one embodiment of the present invention, the reactive power control circuit comprises: a second inductor, wherein a first terminal of the second inductor is coupled to the rectifier and a second terminal of the second inductor is coupled to the converter circuit; a first diode, wherein a cathode of the first diode is coupled to the first terminal of the second inductor; a second diode, wherein a cathode of the second diode is coupled to an anode of the first diode and an anode of the second diode is coupled to a first ground; and a reactive power control capacitor, wherein a first terminal of the reactive power control capacitor is coupled to the second terminal of the second inductor and a second terminal of the reactive power control capacitor is coupled to the anode of the first diode.

According to one embodiment of the present invention, the converter circuit comprises: a transformer comprising a primary winding and a secondary winding, wherein a first terminal of the primary winding is coupled to the second terminal of the second inductor of the reactive power control circuit; and a switch, wherein a first terminal of the switch is coupled to a second terminal of the primary winding and a first terminal of the switch is coupled to a first ground.

According to one embodiment of the present invention, the converter circuit further comprises: a third diode, wherein an anode of the third diode is coupled to a first terminal of the secondary winding; and a third capacitor, wherein a first terminal of the third capacitor is coupled to a cathode of the third diode and a second terminal of the third capacitor is coupled to a second ground.

According to one embodiment of the present invention, when the input DC voltage is greater than a voltage across the reactive power control capacitor and the switch is turned on, the reactive power control capacitor and the second diode form an input voltage step down conducting path, such that the input DC voltage charges the second inductor and the second inductor stores the energy.

According to one embodiment of the present invention, the transformer, the switch and the second diode form a converter transformer magnetization path, such that the transformer stores the energy based on the magnetizing inductance of the transformer.

According to one embodiment of the present invention, when the input DC voltage is greater than a voltage across the reactive power control capacitor and the switch is turned off, the second inductor, the reactive power control capacitor and the first diode form a conducting path, such that energy stored in the second inductor is released to the reactive power control capacitor.

According to one embodiment of the present invention, the transformer, the third diode and a load form a converter transformer demagnetization path, such that the transformer releases energy to the load.

According to one embodiment of the present invention, when the input DC voltage is smaller than or equal to a voltage across the reactive power control capacitor and the switch is turned on, the reactive power control capacitor, the transformer, the switch and the second diode form a converter transformer magnetization path, such that the transformer stores the energy based on the magnetizing inductance of the transformer.

According to one embodiment of the present invention, when the input DC voltage is smaller than or equal to a voltage across the reactive power control capacitor and the switch is turned off, the transformer, the third diode and a load form a converter transformer demagnetization path, such that the transformer releases energy to the load.

The above summary and the following detailed description and accompanying drawings, all in order to further illustrate the present invention to achieve the intended purpose are taken, means and effects. Such other objects and advantages of the invention will be set forth in the subsequent description and the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

The following illustrates specific embodiments of the present invention, and those skilled in the art can readily understand advantages and efficacy of the present invention accordingly.

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
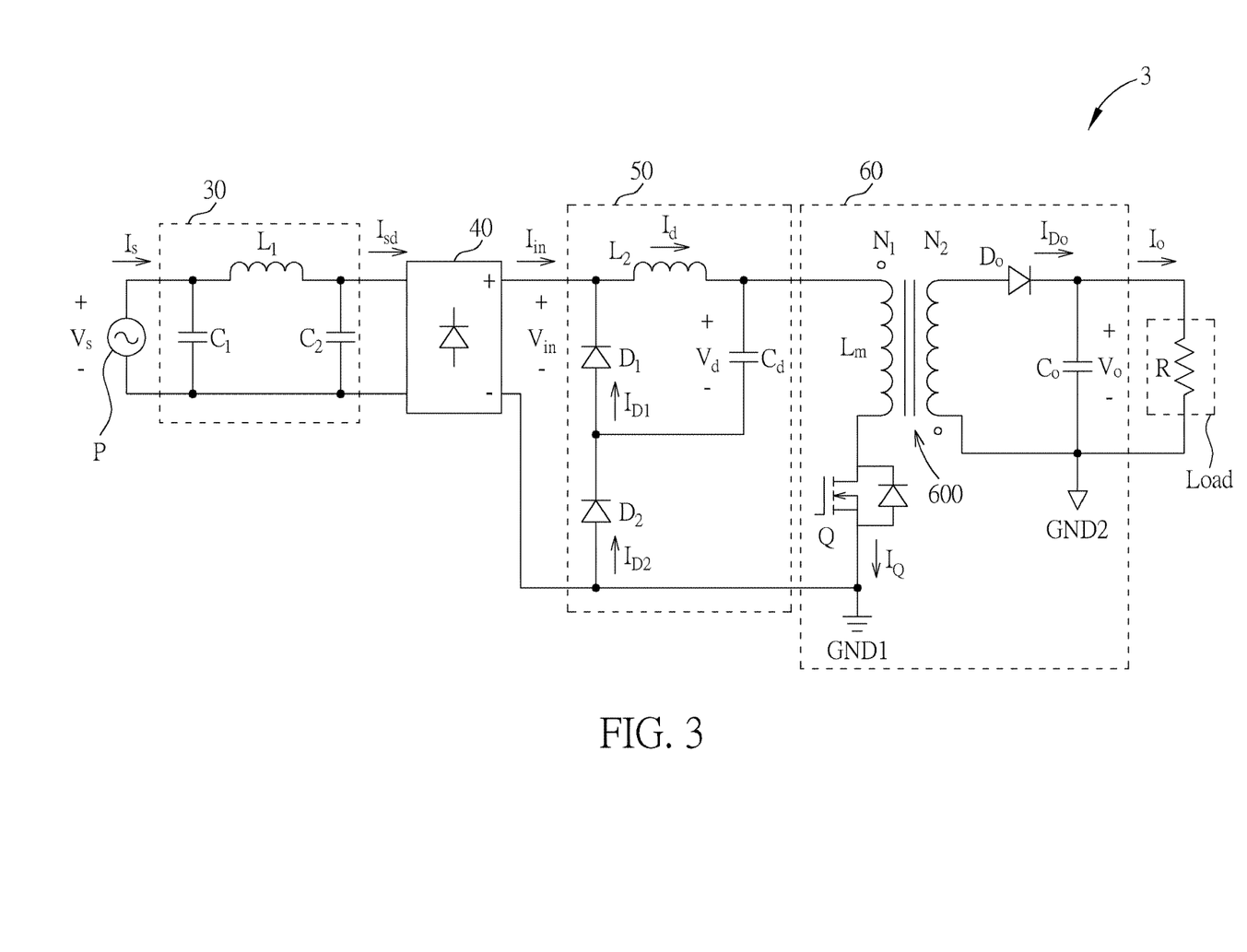
FIG. 3 is a schematic diagram of a high power factor converter according to an embodiment of the present invention.

Please refer to FIG. 3, which is a schematic diagram of a high power factor converter 3 according to an embodiment of the present invention. The high power factor converter 3 is utilized for converting an input AC voltage $V_s$ into an output voltage $V_o$ for a load Load. For example, the load Load may be an electronic device connected to the high power factor converter 3 for charging. The high power factor converter 3 includes an electromagnetic interference (EMI) filter 30, a rectifier 40, a reactive power control circuit 50 and a converter circuit 60. The reactive power control circuit 50 and the converter circuit 60 forms a one stage high power factor converter circuit. The input AC voltage $V_s$ generated by an AC power source P is received by the EMI filter 30 and passed through the EMI filter 30. The EMI filter 30 is utilized for filtering and suppressing EMI noise for AC input. For example, as shown in FIG. 3, the EMI filter 30 includes an inductor L1 and capacitors C1 and C2. A first terminal of the inductor L1 is coupled to the AC power source P and a second terminal of the inductor L1 is coupled to the rectifier 40. A first terminal of the capacitor C1 is coupled to the first terminal of the inductor L1 and a second terminal of the capacitor C1 is coupled to a ground GND1. A first terminal of the capacitor C2 is coupled to the second terminal of the inductor L1 and a second terminal of the capacitor C2 is coupled to the ground GND1. The rectifier 40 receives an input AC voltage Vs through EMI filter 30 and converts the input AC voltage Vs in to an input DC voltage $V_{in}$. The rectifier 40 may be a rectifying diode or a bridge rectifier, but not limited thereto.

The reactive power control circuit 50 is coupled to the rectifier 40 for receiving the input DC voltage $V_{in}$ and performing a reactive power control operation based on the input DC voltage $V_{in}$. The reactive power control circuit 50 includes diodes D1 and D2, an inductor L2 and a reactive power control capacitor Cd. A first terminal of the inductor L2 is coupled to the rectifier 40 and a second terminal of the inductor L2 is coupled to the converter circuit 60. A cathode of the diode D1 is coupled to the first terminal of the inductor L2 and an anode of the diode D1 is coupled to a cathode of the diode D2. An anode of the diode D2 is coupled to the ground GND1. A first terminal of the reactive power control capacitor Cd is coupled to the second terminal of the inductor L2 and a second terminal of the reactive power control capacitor Cd is coupled to the anode of the diode D1 and the cathode of the diode D2. A reactive power control capacitor voltage $V_d$ represent the voltage drop across the reactive power control capacitor Cd.

The converter circuit 60 is coupled to the reactive power control circuit 50. The converter circuit 60 includes a transformer 600, a switch Q, a diode Do and a capacitor Co. The transformer 600 includes a primary winding N1 and a secondary winding N2. The transformer 600 has a turns ratio of N1:N2. The magnetizing inductance of the transformer 600 is Lm. A first terminal of the primary winding N1 is coupled to the second terminal of the inductor L2 and the first terminal of the reactive power control capacitor Cd. The converter circuit 60 may be a flyback converter circuit, but not limited thereto.

The switch Q is configured to control operations of the primary winding N1 of the transformer 600. The switch Q may be controlled with constant switching frequency. A switching period of the switch Q is Ts. A first terminal of the switch Q is coupled to a second terminal of the primary winding N1 and a second terminal of the switch Q is coupled to the ground GND1. A control terminal of the switch Q is utilized for receiving a control signal for operation. For example, the switch Q may be a Metal-Oxide-Semiconductor Field-Effect Transistor (MOSFET), a Bipolar Junction Transistor (BJTs) or other elements with similar functions, but not limited thereto. An anode of the diode Do is coupled to a first terminal of the secondary winding N2 and a cathode of the diode Do is coupled to a first terminal of the capacitor Co. A second terminal of the capacitor Co is coupled to a ground GND2. The capacitor Co is connected in parallel with the load Load.

Figure 4:
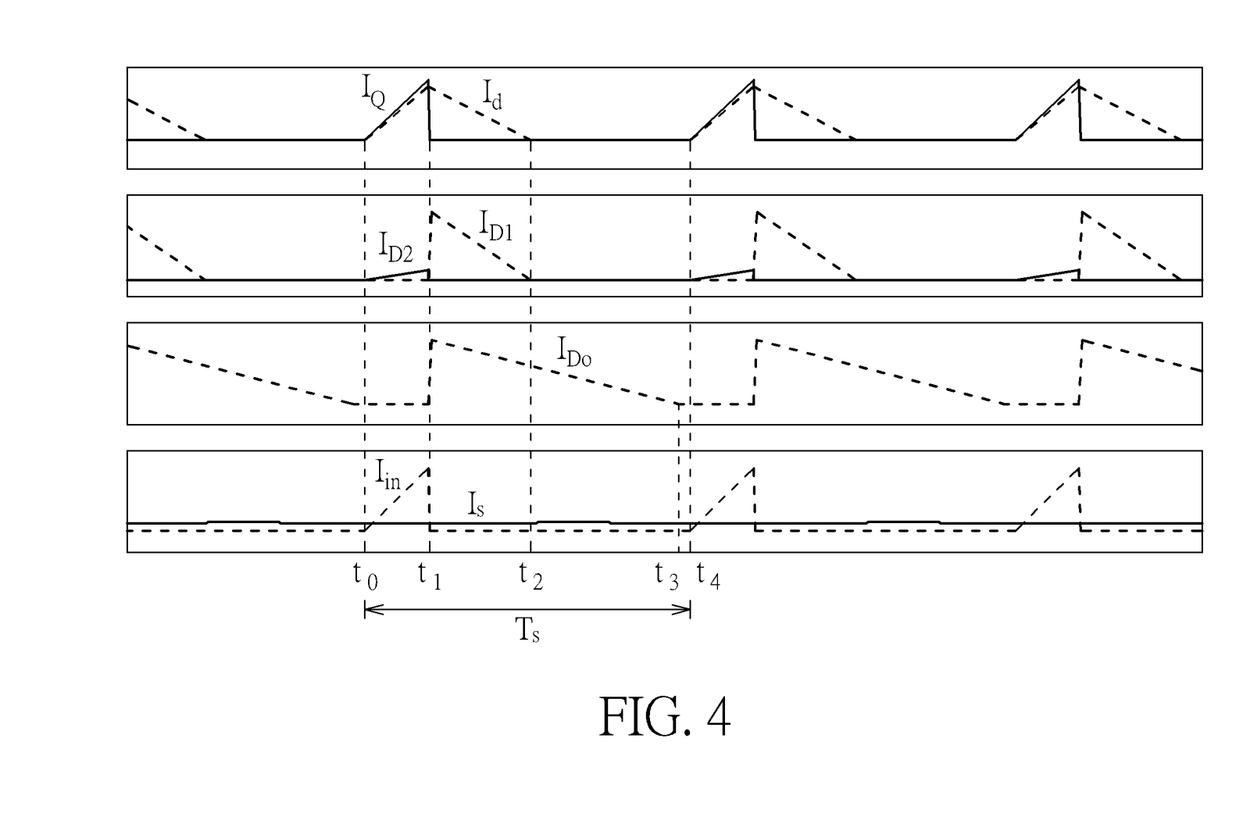
FIG. 4 is a timing diagram of the high power factor converter shown in FIG. 3 when the input DC voltage is greater than the reactive power control capacitor voltage according to an embodiment of the present invention.

In an embodiment, please refer to FIG. 4 and FIGS. 5A-5D. FIG. 4 is a timing diagram of the high power factor converter 3 shown in FIG. 3 when the input DC voltage $V_{in}$ is greater than the reactive power control capacitor voltage $V_d$ according to an embodiment of the present invention. FIG. 5A to FIG. 5D are schematic diagrams illustrating the operations of the high power factor converter 3 in different periods when the input DC voltage $V_{in}$ is greater than the reactive power control capacitor voltage $V_d$ according to embodiments of the present invention. When the input DC voltage $V_{in}$ is greater than the reactive power control capacitor voltage $V_d$, the rectifier 40 is conducted to operate.

Figure 5A:
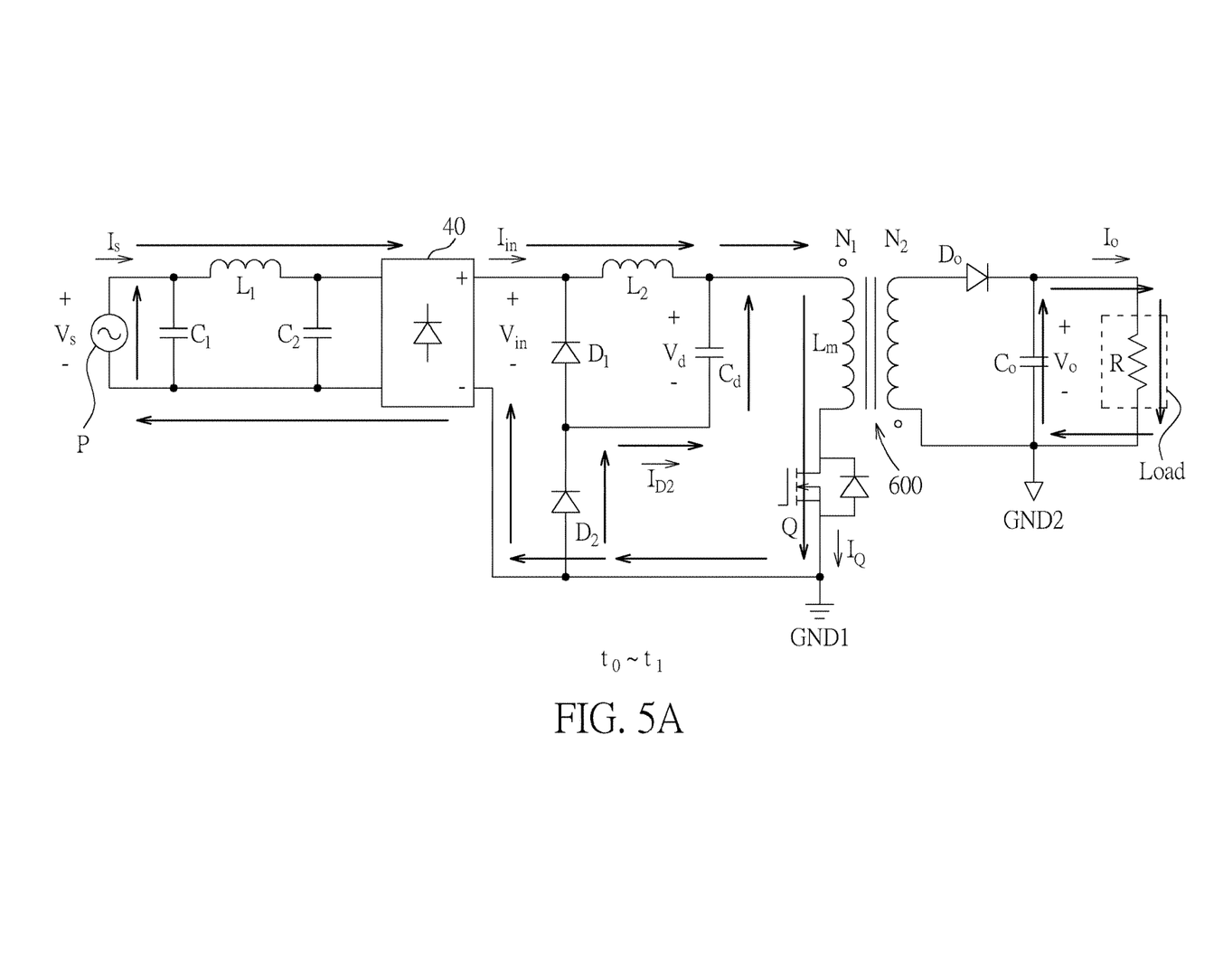
FIG. 5A to FIG. 5D are schematic diagrams illustrating the operations of the high power factor converter in different periods when the input DC voltage is greater than the reactive power control capacitor voltage according to embodiments of the present invention.

As shown in FIG. 4 and FIG. 5A, during a first period between t0 and t1 of a switching period Ts, the input DC voltage $V_{in}$ is greater than the reactive power control capacitor voltage $V_d$. The switch Q is turned on (in the conducting state). In such a condition, the input DC voltage $V_{in}$, the inductor L2, the reactive power control capacitor Cd and the diode D2 form an input voltage step down conducting path, such that the input DC voltage $V_{in}$ charges the inductor L2 and the inductor L2 stores the energy. Moreover, the reactive power control capacitor Cd, the transformer 600, the switch Q and diode D2 form a converter transformer magnetization path, such that the transformer 600 stores the energy based on the magnetizing inductance Lm of the transformer 600. Therefore, during the first period between t0 and t1, the current $I_d$ passing through the inductor L2 and the current $I_Q$ passing through the switch Q rise linearly. The current $I_{D2}$ passes through the reactive power control capacitor Cd and the reactive power control capacitor Cd discharges. The current $I_{D2}$ is a difference between the current $I_Q$ and the current $I_d$. The capacitor Co provides energy to the load Load.

Figure 5B:
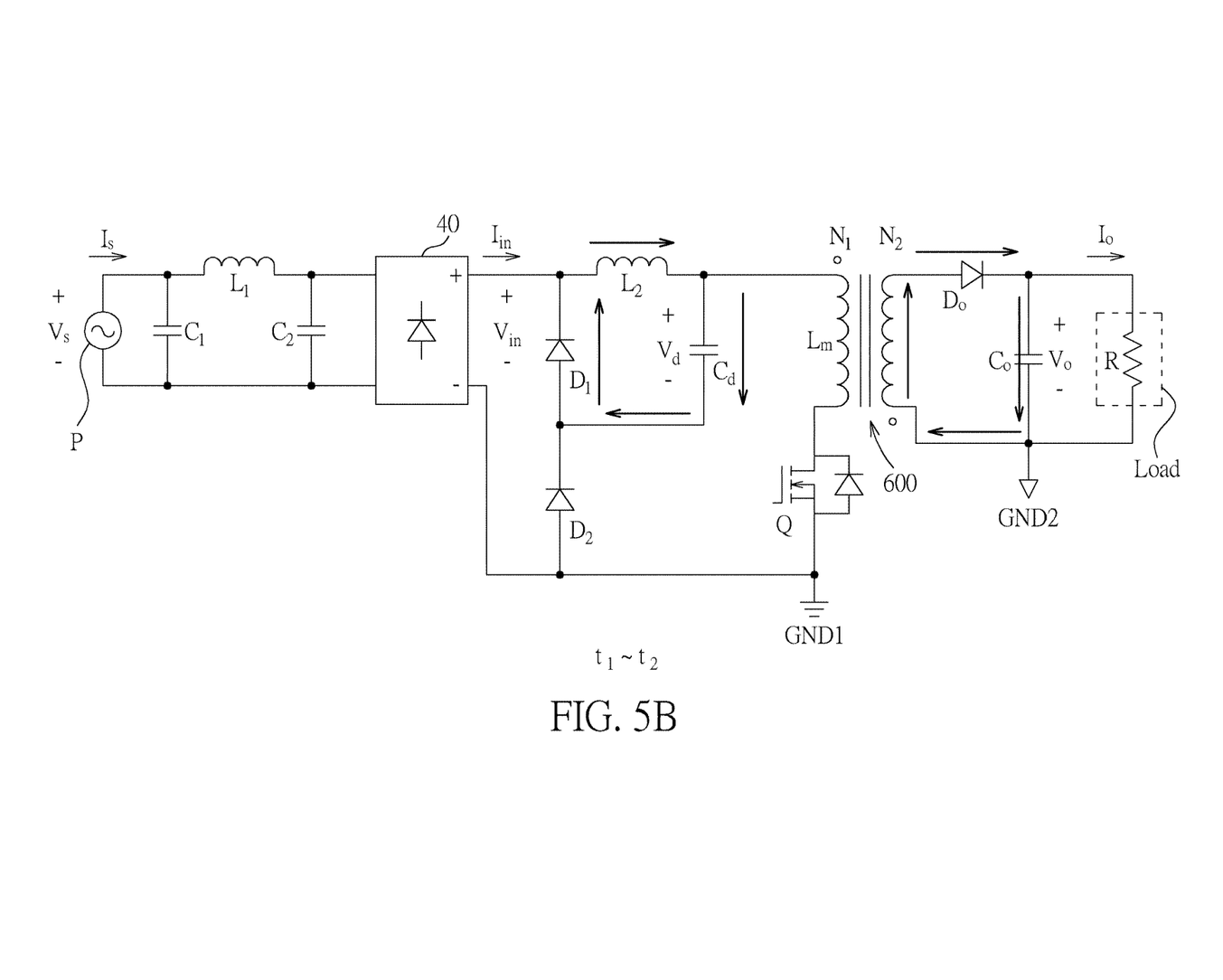

As shown in FIG. 4 and FIG. 5B, during a second period between t1 and t2 of the switching period Ts, the switch Q is turned off (in the off state). In such a condition, the inductor L2, the reactive power control capacitor Cd and the diode D1 form a conducting path, such that energy stored in the inductor L2 is released to the reactive power control capacitor Cd. Moreover, the transformer 600, the diode Do and the load Load form a converter transformer demagnetization path, such that the transformer 600 releases energy to the load Load. Therefore, during the second period between t1 and t2, the current $I_d$ passing through the inductor L2 and the current $I_{Do}$ passing through the diode Do fall linearly. The current $I_{D1}$ is equal to the current $I_d$. The capacitor Co provides energy to the load Load.

Figure 5C:
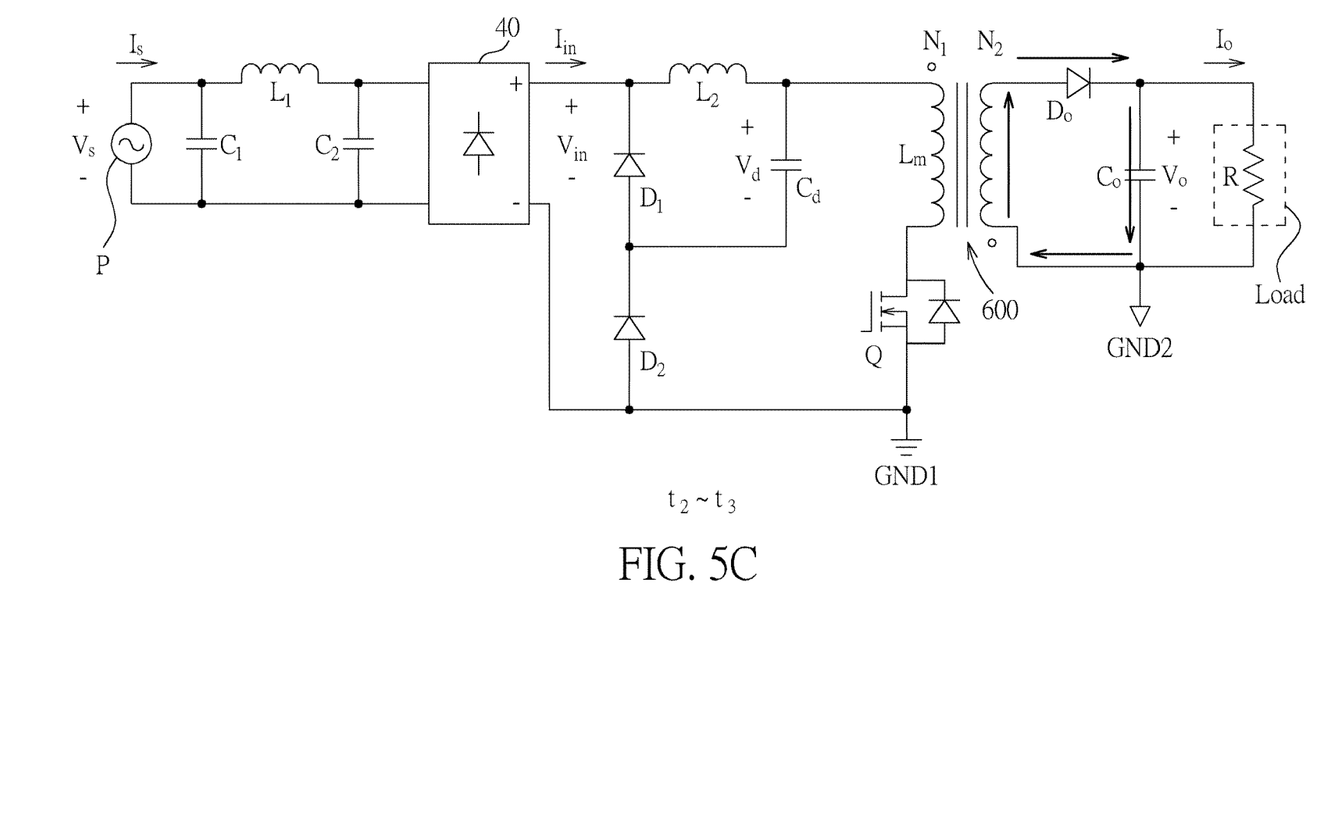

As shown in FIG. 4 and FIG. 5C, during a third period between t2 and t3 of the switching period Ts shown in FIG. 4, the current $I_d$ falls to zero and all of the components at the primary winding side of the transformer 600 may stop working. The secondary winding N2 of the transformer 600 continues to release energy to the load Load. The current $I_{Do}$ passing through the diode Do continues to fall linearly until it becomes zero.

Figure 5D:
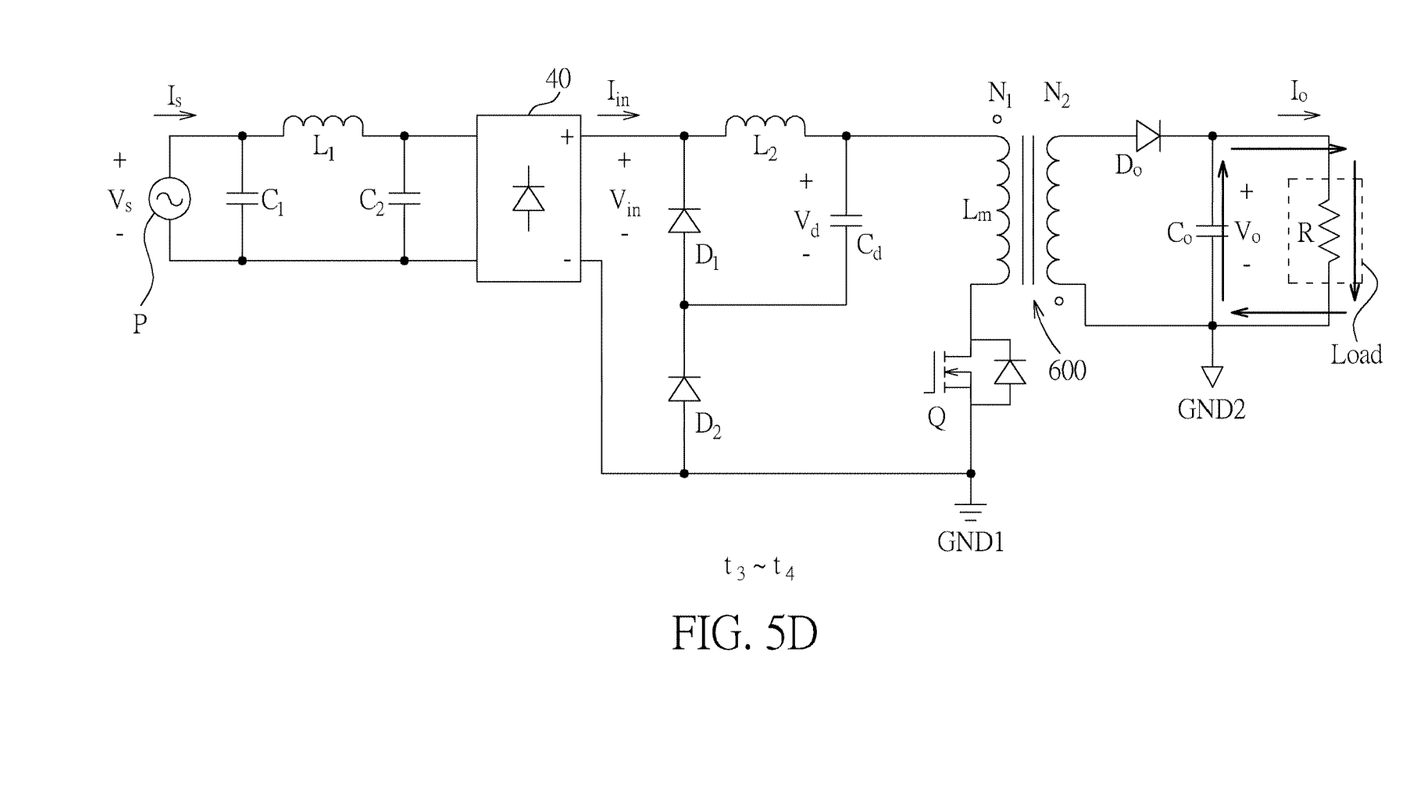

As shown in FIG. 4 and FIG. 5D, during a fourth period between t3 and t4 of the switching period Ts shown in FIG. 4, all of the components at the primary winding side and the secondary winding side of the transformer 600 may stop working. The required energy of the load Load is provided by the capacitor Co. A shown in FIG. 4, the switching period Ts is ended at the time point t4. Similarly, the switch Q can be controlled to conduct in the following switching period.

Figure 6:
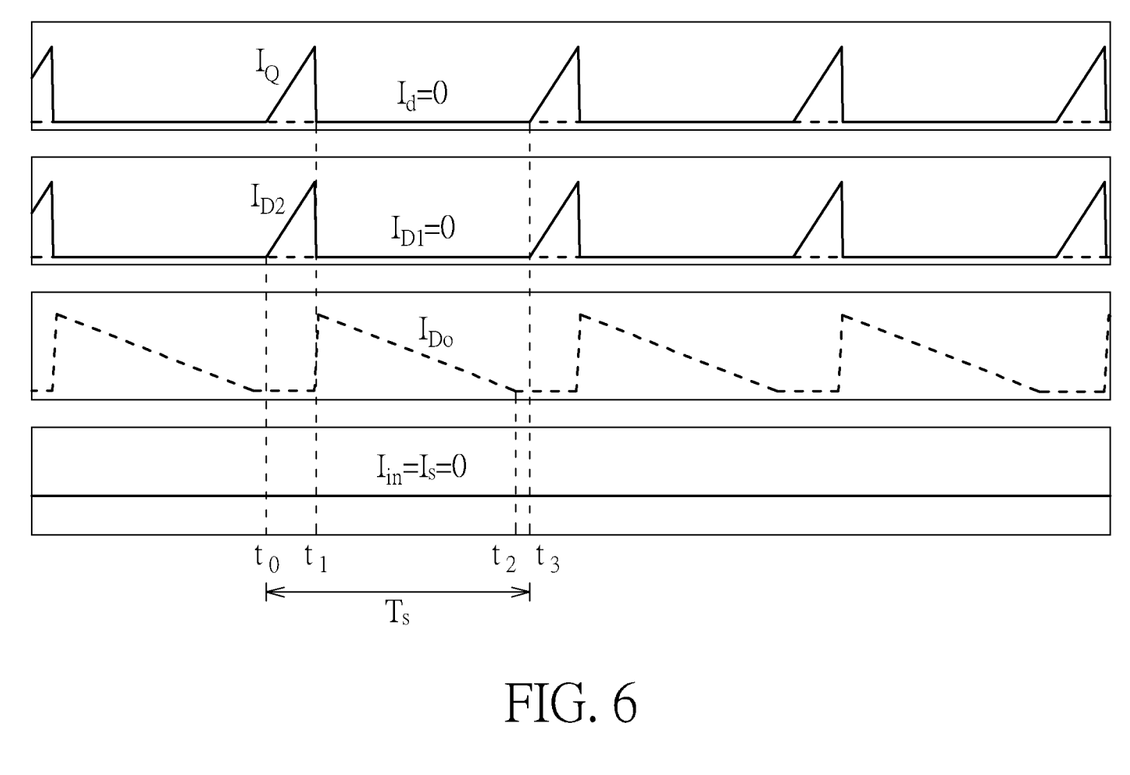
FIG. 6 is a timing diagram of the high power factor converter shown in FIG. 3 when the input DC voltage is smaller than or equal to the reactive power control capacitor voltage according to an embodiment of the present invention.
Figure 7A:
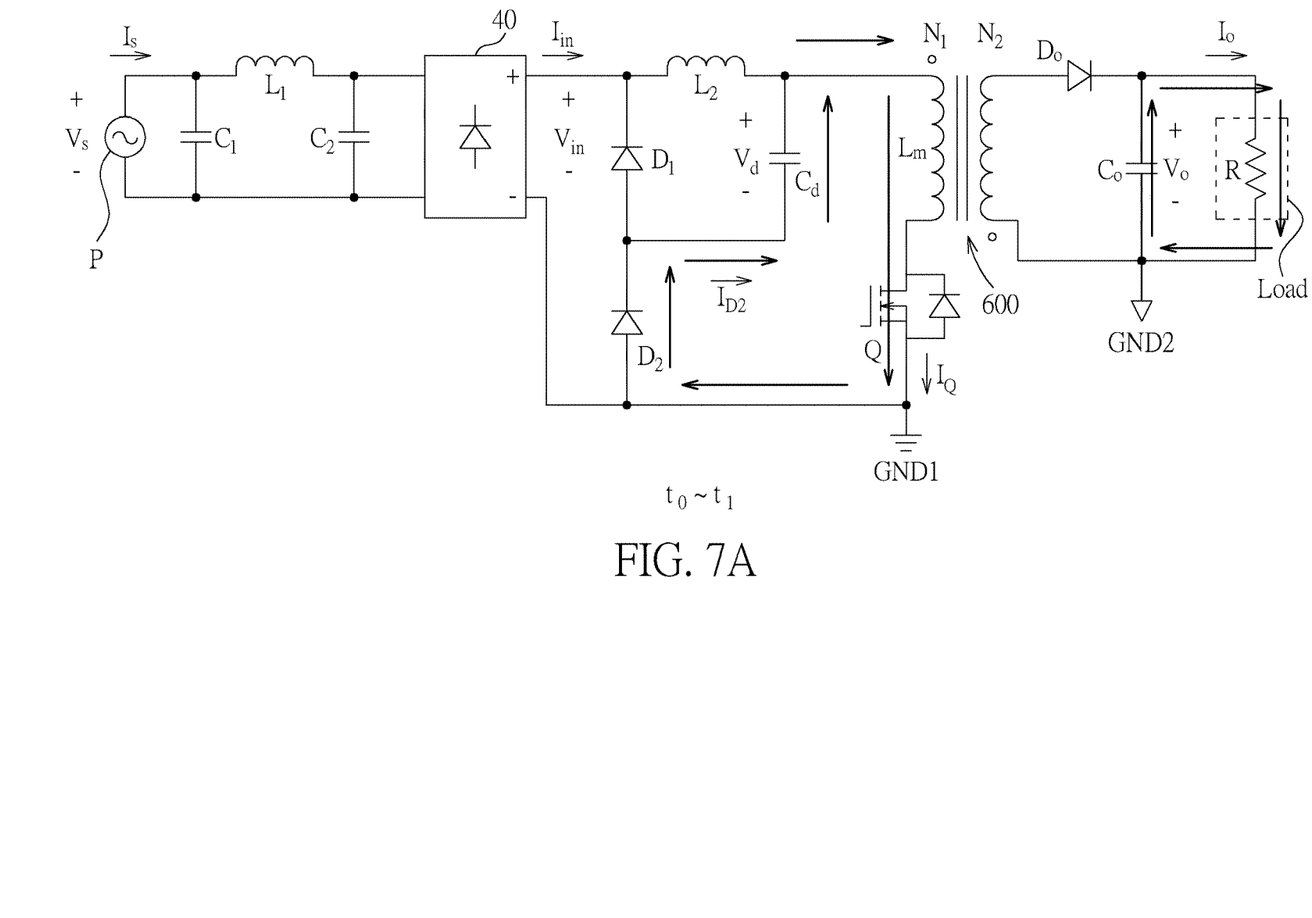
FIG. 7A to FIG. 7C are schematic diagrams illustrating the operations of the high power factor converter in different periods when the input DC voltage is smaller than or equal to the reactive power control capacitor voltage according to embodiments of the present invention.
Figure 7B:
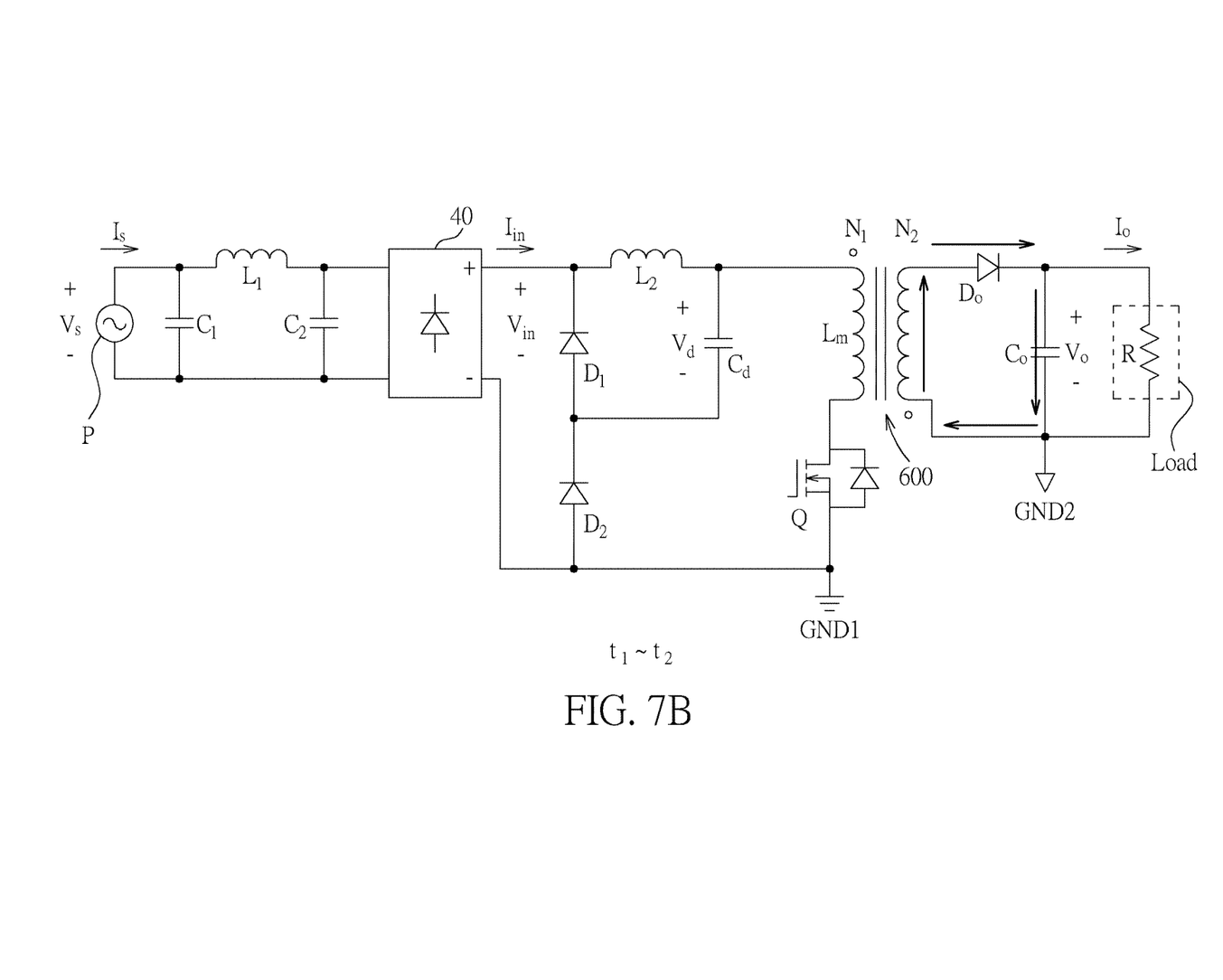
Figure 7C:
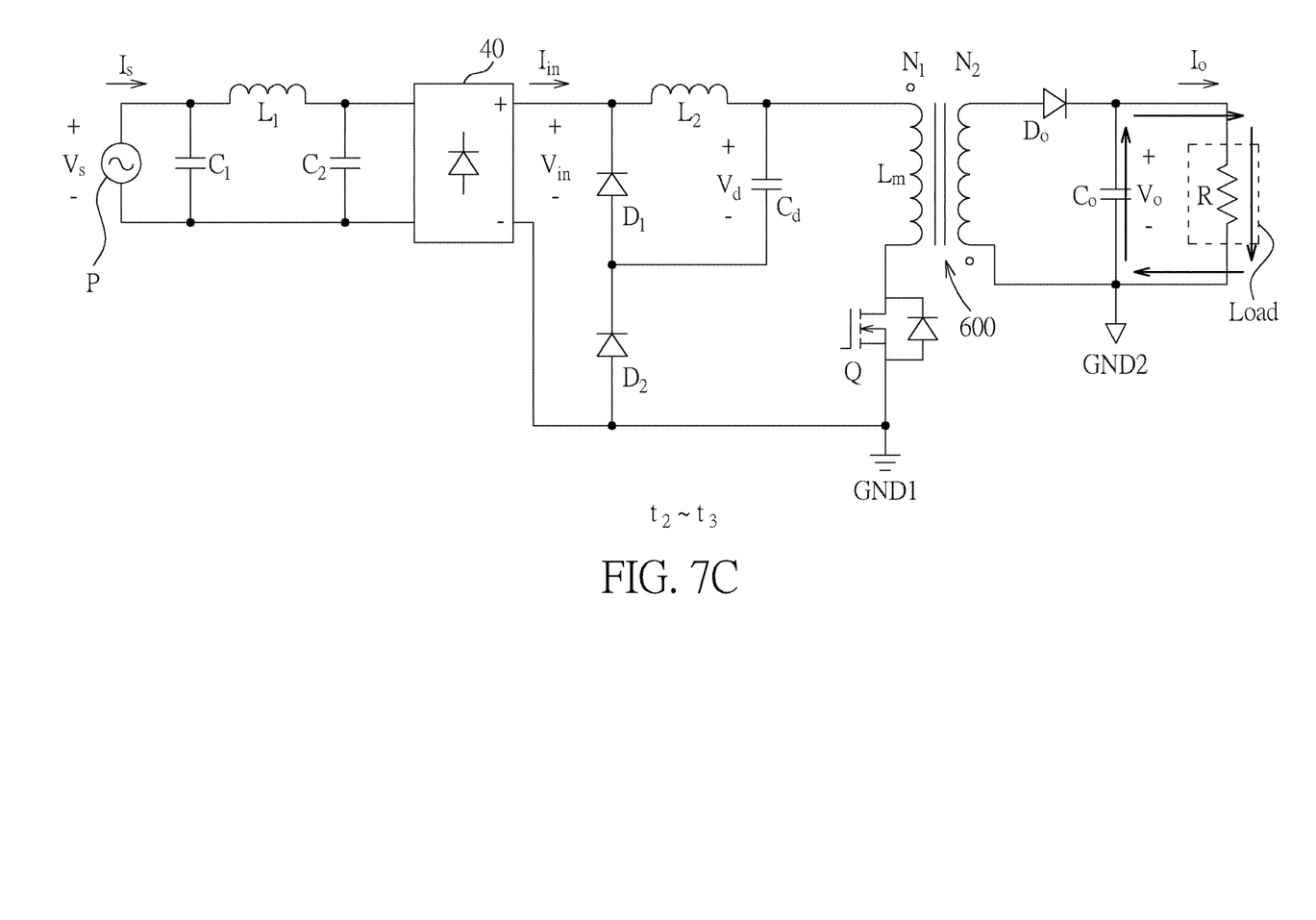

In an alternative embodiment, please refer to FIG. 6 and FIGS. 7A-7C. FIG. 6 is a timing diagram of the high power factor converter 3 shown in FIG. 3 when the input DC voltage $V_{in}$ is smaller than or equal to the reactive power control capacitor voltage $V_d$ according to an embodiment of the present invention. FIG. 7A to FIG. 7C are schematic diagrams illustrating the operations of the high power factor converter 3 in different periods when the input DC voltage $V_{in}$ is smaller than or equal to the reactive power control capacitor voltage $V_d$ according to embodiments of the present invention. When the input DC voltage $V_{in}$ is smaller than or equal to the reactive power control capacitor voltage $V_d$, the rectifier 40 is not conducted to operate and does not work. Under such a situation, the energy of the high power factor converter 3 is provided from the reactive power control capacitor Cd.

As shown in FIG. 6 and FIG. 7A, during a first period between t0 and t1 of the switching period Ts, the switch Q is turned on (in the conducting state). In such a condition, the reactive power control capacitor Cd, the transformer 600, the switch Q and diode D2 form a converter transformer magnetization path, such that the transformer 600 stores the energy based on the magnetizing inductance Lm of the transformer 600. Therefore, during the first period between t0 and t1, the current $I_Q$ passing through the switch Q rises linearly. The current $I_{D2}$ passes through the reactive power control capacitor Cd and the reactive power control capacitor Cd discharges.

As shown in FIG. 6 and FIG. 7B, during a second period between t1 and t2 of the switching period Ts, the switch Q is turned off (in the off state). In such a condition, the transformer 600, the diode Do and the load Load form a converter transformer demagnetization path, such that the transformer 600 releases energy to the load Load. During the second period between t1 and t2, the current $I_{Do}$ passing through the diode Do falls linearly and current $I_{Do}$ passing through the diode Do reaches zero at time point t2.

As shown in FIG. 6 and FIG. 7C, during a third period between t2 and t3 of the switching period Ts shown in FIG. 6, all of the components at the primary winding side and the secondary winding side of the transformer 600 may stop working. Energy required by the load Load is provided by the capacitor Co. The switching period Ts is ended at the time point t3. Similarly, the switch Q can be controlled to conduct in the following switching period.

Figure 8:
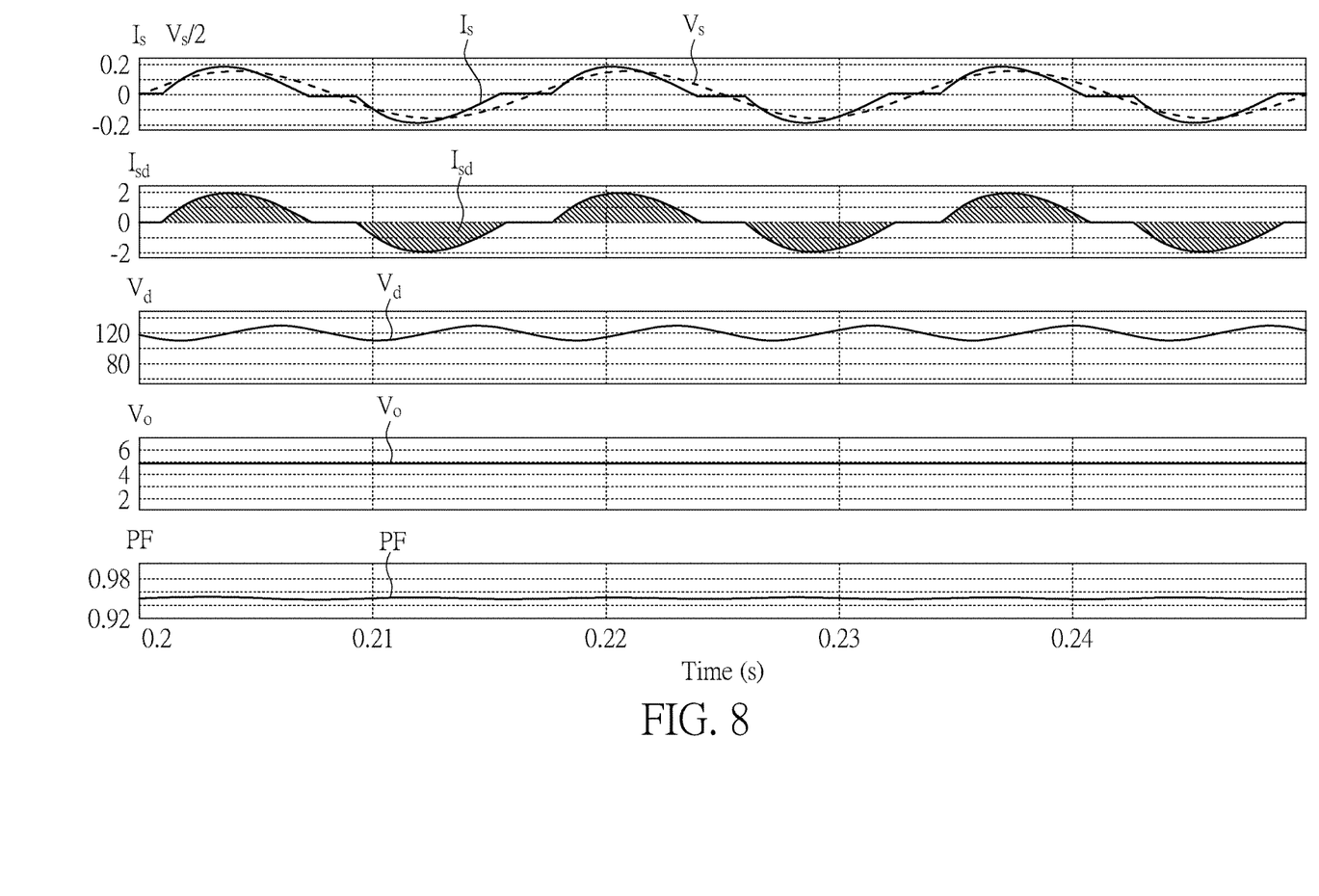
FIG. 8 is a waveform diagram of experiments of the high power factor converter shown in FIG. 3.

FIG. 8 is a waveform diagram of experiments of the high power factor converter 3 shown in FIG. 3, which is operated with the following conditions: the input AC voltage $V_s$ is 220 Vrms, the output DC voltage $V_o$ is 5V, the output power is 20 W, the inductance of the inductor L2 is 200 µH, the capacitance of the reactive power control capacitor Cd is 33 µF, the inductance Lm of the transformer 600 is 120 µH, the turns ratio is 5:1, the capacitance of the capacitor Co is 100 µF. A peak current mode control is applied and the switching frequency is set to 100 kHz. All of the results obtained in experiments are in agreement with the simulation results in FIG. 8. As shown in FIG. 8, when the input DC voltage $V_{in}$ is greater than the reactive power control capacitor voltage $V_d$, the rectifier 40 is conducted to operate and the waveform of the current $I_s$ is close to a perfect sinusoidal wave. The power factor PF is extremely high at 0.952 that shows improvement in the power factor. As such, the secondary reactive power is indeed stored on the reactive power control capacitor Cd so that the average of the input AC voltage is 120V and suffers from significant secondary ripple. In fact, since the secondary reactive power is absorbed by the reactive power control capacitor Cd, the output voltage $V_o$ is a DC voltage with very low voltage ripple. Further, the voltage ripple is high frequency ripple and no secondary low frequency ripple occurs. Therefore, the high power factor converter 3 of the invention can provide the function of high power factor and low output voltage ripple.

In summary, the present invention utilizes the reactive power control circuit to absorb the reactive power and accordingly attenuate the influence of the secondary ripple so as to provide the output voltage with very low voltage ripple. Moreover, compared with the prior art, the present invention can provide the functions of high power factor and low output voltage ripple without employing a large output capacitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high power factor converter, comprising:
   a rectifier for receiving an input alternating current (AC) voltage and converting the input AC voltage in to an input direct current (DC) voltage;
   a reactive power control circuit coupled to the rectifier for performing a reactive power control operation based on the input DC voltage, comprising:
   a second inductor, wherein a first terminal of the second inductor is coupled to the rectifier and a second terminal of the second inductor is coupled to the converter circuit;
   a first diode, wherein a cathode of the first diode is coupled to the first terminal of the second inductor;
   a second diode, wherein a cathode of the second diode is coupled to an anode of the first diode and an anode of the second diode is coupled to a first ground; and
   a reactive power control capacitor, wherein a first terminal of the reactive power control capacitor is coupled to the second terminal of the second inductor and a second terminal of the reactive power control capacitor is coupled to the anode of the first diode; and
   a converter circuit coupled to the reactive power control circuit for converting the input DC voltage into an output voltage.

2. The high power factor converter of claim 1, further comprising:
   an electromagnetic interference (EMI) filter for filtering and suppressing EMI noise for the input AC voltage, comprising:
   a first inductor, wherein a first terminal of the first inductor is coupled to an AC power source for receiving the input AC voltage and a second terminal of the first inductor is coupled to the rectifier;
   a first capacitor, wherein a first terminal of the first capacitor is coupled to the first terminal of the first inductor and a second terminal of the first capacitor is coupled to the rectifier; and
   a second capacitor, wherein a first terminal of the second capacitor is coupled to the second terminal of the first inductor and a second terminal of the second capacitor is coupled to the rectifier.

3. The high power factor converter of claim 1, wherein the converter circuit comprises:
   a transformer comprising a primary winding and a secondary winding, wherein a first terminal of the primary winding is coupled to the second terminal of the second inductor of the reactive power control circuit; and
   a switch, wherein a first terminal of the switch is coupled to a second terminal of the primary winding and a first terminal of the switch is coupled to the first ground.

4. The high power factor converter of claim 3, wherein the converter circuit further comprises:
   a third diode, wherein an anode of the third diode is coupled to a first terminal of the secondary winding; and
   a third capacitor, wherein a first terminal of the third capacitor is coupled to a cathode of the third diode and a second terminal of the third capacitor is coupled to a second ground.

5. The high power factor converter of claim 4, wherein when the input DC voltage is greater than a voltage across the reactive power control capacitor and the switch is turned on, the reactive power control capacitor and the second diode form a conducting path, such that the input DC voltage charges the second inductor and the second inductor stores the energy.

6. The high power factor converter of claim 5, wherein the transformer, the switch and the second diode form a converter transformer magnetization path, such that the transformer stores the energy based on a magnetizing inductance of the transformer.

7. The high power factor converter of claim 4, wherein when the input DC voltage is greater than a voltage across the reactive power control capacitor and the switch is turned off, the second inductor, the reactive power control capacitor and the first diode form a conducting path, such that energy stored in the second inductor is released to the reactive power control capacitor.

8. The high power factor converter of claim 7, wherein the transformer, the third diode and a load form a converter transformer demagnetization path, such that the transformer releases energy to the load.

9. The high power factor converter of claim 4, wherein when the input DC voltage is smaller than or equal to a voltage across the reactive power control capacitor and the switch is turned on, the reactive power control capacitor, the transformer, the switch and the second diode form a converter transformer magnetization path, such that the transformer stores the energy based on a magnetizing inductance of the transformer.

10. The high power factor converter of claim 4, wherein when the input DC voltage is smaller than or equal to a voltage across the reactive power control capacitor and the switch is turned off, the transformer, the third diode and a load form a converter transformer demagnetization path, such that the transformer releases energy to the load.

\* \* \* \* \*